(12) United States Patent
Wood

(10) Patent No.: US 6,740,892 B2
(45) Date of Patent: May 25, 2004

(54) AIR-COOLED LAMP, AND ARTICLE TREATMENT SYSTEM AND METHOD UTILIZING AN AIR-COOLED LAMP

(75) Inventor: Charles H. Wood, Rockville, MD (US)

(73) Assignee: Fusion UV Systems, Inc., Gaithersburg, MD (US)

( * ) Notice: Subject to any disclaimer, the term of this patent is extended or adjusted under 35 U.S.C. 154(b) by 27 days.

(21) Appl. No.: 10/029,975

(22) Filed: Dec. 31, 2001

(65) Prior Publication Data

US 2003/0094904 A1 May 22, 2003

Related U.S. Application Data

(63) Continuation-in-part of application No. 09/989,037, filed on Nov. 21, 2001.

(51) Int. Cl.$^7$ .............................................. H05B 37/02
(52) U.S. Cl. ............................. 250/492.1; 250/493.1; 250/504 R; 315/149; 315/157
(58) Field of Search ..................... 362/34; 445/492.1; 250/313, 492.1, 493.1; 315/149, 157

(56) References Cited

U.S. PATENT DOCUMENTS 4,032,817 A    6/1977  Richmond
4,033,263 A    7/1977  Richmond
4,297,583 A   10/1981  Nerod
4,503,086 A    3/1985  Schultz
5,003,185 A  * 3/1991  Burgio, Jr. .................. 427/510
5,057,747 A  * 10/1991  Henderson .................. 315/158
5,858,040 A  * 1/1999  Hansen ....................... 55/385.2
6,259,107 B1   7/2001  Becraft et al.

* cited by examiner

Primary Examiner—John R. Lee
Assistant Examiner—James J. Leybourne
(74) Attorney, Agent, or Firm—Antonelli, Terry, Stout & Kraus, LLP

(57) ABSTRACT

An article treatment system and method utilizing an air-cooled lamp and having reduced cooling requirement. A power supply responds to a sensor sensing the presence of an article at an article treating location by providing power to an air-cooled lamp, causing the lamp to project radiation onto the article at a radiation level sufficient to effectively treat the article. An air blower blows air onto the lamp, and a blower driver is responsive to the level of the power being provided to the lamp to drive the air blower at a speed blowing air onto the lamp with an air pressure having a non-linear relationship with the power level.

70 Claims, 2 Drawing Sheets

AIR-COOLED LAMP, AND ARTICLE TREATMENT SYSTEM AND METHOD UTILIZING AN AIR-COOLED LAMP

CROSS-REFERENCE TO RELATED APPLICATION

This application is a continuation-in-part of U.S. patent application Ser. No. 09/989,037, filed Nov. 21, 2001.

FIELD OF THE INVENTION

The present invention pertains to a system for and method of treating articles. Further, the present invention pertains to a lamp system usable in an article treating system and method. More particularly, the present invention pertains to controlling the cooling of an air-cooled lamp, such as an ultraviolet lamp, so as to optimize operation of the lamp.

BACKGROUND OF THE INVENTION

Lamps, and in particular ultraviolet lamps such as electrodeless ultraviolet lamps, are utilized in various manufacturing operations. By way of example, many materials are cured by exposure to ultraviolet radiation from electrodeless ultraviolet curing lamps. Such electrodeless lamps are energized by, for example, a magnetron which receives power from a power supply and generates microwaves that energize the electrodeless ultraviolet lamp. Such an ultraviolet lamp must not be allowed to become overheated, or the life of the lamp will be significantly shortened. In use in commercial operations, such as curing of materials that have been applied on products being manufactured, the lamps might be operated at a high power level. To avoid overheating of the lamps, cooling air is blown onto the lamps from a blower. If the lamps are continuously operated at their intended full-power level, cooling air at a high pressure is required. This results in a high energy requirement for the blower providing the cooling air.

To avoid this, it is known to operate the lamps at a somewhat lower power level. While this enables adequate cooling to be provided with air at a lower pressure, it also reduces the efficiency of the curing process since the lamps emit less radiation at the lower power level. It is also known to operate the lamps with a duty cycle of, for example, four seconds on and one second off. High efficiency ultraviolet lamps use multiple element emitter type fills, such as mercury and iron halides. In normal operation such lamps might have a temperature in the range of from about 750° C. to about 950° C., and these fills are in a gaseous state. If the ultraviolet lamp is shut off for any significant time, the fills may condense. In addition, if the lamp is turned off, then the ionized plasma extinguishes and the mercury vapor must be allowed to cool for a period of time, generally between fifteen seconds and two minutes, before the lamp can again be powered. This can significantly delay the process in which the lamps being used. Additional problems which can result from such overcooling include unstable and erratic ultraviolet output levels, especially at 60% and lower power levels, delays in ultraviolet output response of three seconds or more when going from lower power to high power, spectral changes, resulting in shifting of the ultraviolet band, which can have a negative impact in some ultraviolet curing applications, bulb fill condensation, resulting in unwanted chemical reactions of some bulb fill additives with the ultraviolet lamp bulb, thereby reducing the bulb life, and excessive noisy and unnecessary cooling at power levels less than 100%. As a consequence, rather than turning such lamps off during their duty cycle, the lamps are usually powered at a low level, for example being provided with 2% to 50% of their intended full power.

If the ultraviolet lamp is provided with cooling air a constant pressure, then during the high power portions of the duty cycle, the lamp temperature increases, while during the low power portions of the duty cycle, the temperature of the lamp decreases. It is necessary to maintain the lamp temperature within an operating range of about 700° C. to about 1000° C., preferably 750° C. to 950° C., since temperatures lower than that range can result in the lamp fills condensing, causing damage to the lamp, while temperatures in excess of the range can shorten the lamp life. To accommodate this, it is known to adjust the air pressure in proportion to the power provided to the ultraviolet lamp. See, for example, U.S. Pat. No. 4,032,817. However, in fact the cooling requirements are not proportional to the power provided to the ultraviolet lamp. Consequently, such systems can overcool the ultraviolet lamps.

SUMMARY OF THE INVENTION

The present invention is a system for and method of controlling the cooling in a lamp system, as well as a system for and method of treating articles with a lamp system. In accordance with the present invention, an air-cooled lamp such as an electrodeless ultraviolet lamp, is provided with power, while an air blower blows air onto the air-cooled lamp to cool the lamp, and a blower driver is responsive to the power level of the power being provided to the air-cooled lamp to drive the air blower at a speed blowing air onto the air-cooled lamp with an air pressure having a non-linear relationship with the power level when the power level is expressed as a percentage of the lamps intended full-power level. Preferably, the relationship is substantially exponential or is substantially defined by $A_p=(P-P_o)^2$, where $A_p$ is the air pressure, P is the power level of the power being provided to the air-cooled lamp as a percentage of the full-power level, and $P_o$ is a power level as a percentage of the full-power level that when provided to the air-cooled lamp requires no air to be blown by the air blower onto the air-cooled lamp. Preferably, also, the cooling level is minimized as much as possible at all power levels, while not overheating the air-cooled lamp. Further, the present invention is a machine-readable medium having stored thereon at least one sequence of instructions that, when executed, cause a machine to cool an air-cooled lamp.

BRIEF DESCRIPTION OF THE DRAWINGS

These and other aspects and advantages of the present invention are more apparent from the following detailed description and claims, particularly when considered in conjunction with the accompanying drawings. In the drawings:

DETAILED DESCRIPTION OF PREFERRED EMBODIMENTS

Figure 1:
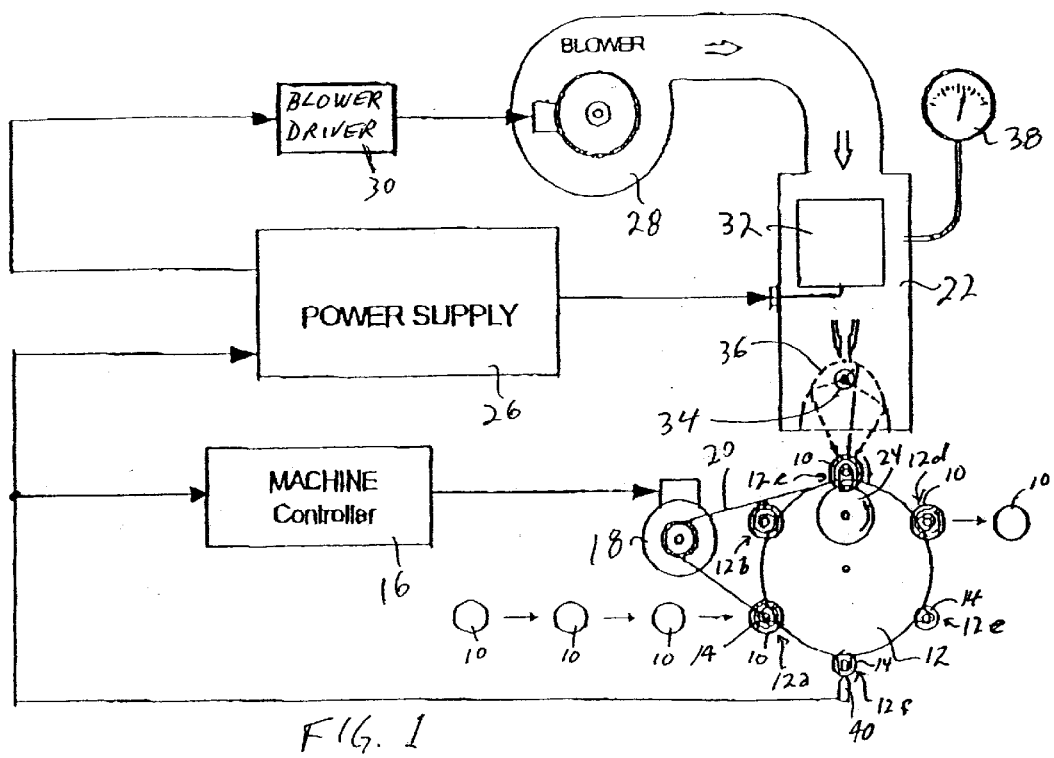
FIG. 1 is a block diagram of a first embodiment of an article treatment system in accordance with the present invention.

FIG. 1 illustrates a number of articles 10 approaching, and then being conveyed on an article conveyor 12. Article conveyor 12 is provided with a number of article conveying stations, illustrated in FIG. 1 as stations 12a–12f. An article 10 is mounted on an article holder 14 at station 12a. Machine controller 16 provides a start signal to motor 18, causing the motor to drive article conveyor 12, for example by means of a drive belt 20, so that in the representative embodiment of FIG. 1 article conveyor 12 rotates in a clockwise direction, bringing each article 10 in turn from station 12a through station 12b and to an article treating location at station 12c. An air-cooled lamp assembly 22 is positioned to project radiation onto an article 10 when that article is at article treating location 12c. A rotation device 24 rotates counterclockwise in the embodiment of FIG. 1 to cause the article 10 at station 12c to rotate clockwise about the axis of article holder 14 so as to sequentially expose the entire side surface of that article 10 to radiation from lamp assembly 22.

A power supply 26 provides power to lamp assembly 22, while a blower 28 provides cooling air to the lamp assembly. Blower 28 is controlled by blower driver 30, for example a variable frequency motor drive, with the speed of blower 28 being proportional to the frequency of the motor drive output.

In the illustrative example of FIG. 1, lamp assembly 22 includes a magnetron 32 which receives power from power supply 26 to generate microwaves, an electrodeless ultraviolet bulb 34, and a reflector 36. The microwave energy from magnetron 32 energizes bulb 34, causing the bulb to emit ultraviolet radiation. Reflector 36 concentrates that radiation on the article 10 at article treating station 12c. High pressure air from air blower 28 flows over magnetron 32. Reflector 36 is provided with openings for passage of the air to permit the air to cool bulb 34. Since the end of lamp assembly 22 facing article treating location 12c is open, the area surrounding bulb 34 is at substantially atmospheric pressure. An air pressure gage 38 provides an indication of the pressure differential across reflector 36, and thus the air pressure within lamp assembly 22.

Once the article 10 is treated by the radiation at article treating station 12c, continued rotation of article conveyor 12 brings the treated article 10 to station 12d at which the treated article is removed from the article holder 14, as indicated in FIG. 1. Further rotation of article conveyor 12 then brings that article holder through stations 12e and 12f, and back to station 12a for receipt of another article 10.

A sensor 40 is provided adjacent station 12f to detect the presence or absence of an article holder at that station. Because the stations 12a–12f are equally spaced about the circumference of article conveyor 12, detection of the presence or absence of an article holder at station 12f detects the presence or absence of an article at the article treating location of station 12c. The output from sensor 40 is applied to machine controller 16 and to power supply 26. Power supply 26 provides blower driver 30 with a signal indicating the level of the power supplied to lamp assembly 22.

In operation, machine controller 16 actuates motor 18 to rotate article conveyor 12, bringing an article 10 to the article treating location at station 12c. When sensor 40 senses the article holder 14 at station 12f, the sensor applies a signal to machine controller 16 and to power supply 26, deactivating machine controller 16 so as to shut off motor 18, and bringing power supply 26 to its high power state, so as to cause lamp assembly 22 to emit radiation at a level sufficient to effectively treat the article at station 12c. Based on the signal from power supply 26 indicating the level of the power being supplied to lamp assembly 22, blower driver 20 actuates blower 28 at a speed to blow air at an appropriate pressure onto lamp assembly 22 to cool the lamp sufficiently to avoid overheating.

After a time sufficient to permit complete treatment of the article 10 at article treating location 12c, machine controller 16 again actuates motor 18 to rotate article conveyor 12, advancing the treated article to station 12d for removal of the treated article from article conveyor 12, and advancing the next article 10 from station 12b to station 12c for treatment. Rotating article convey 12 is, of course, only one type of conveyor that might be utilized to convey articles to and then from an article treating station such as station 12c. By way of example, an endless belt conveyor might be used. Machine controller 16, for example, might be an electronic switch and a timer to turn off motor 18 in response to a presence-of-article signal from sensor 40 and to turn the motor back on after sufficient time for rotation device 24 to have rotated the article being treated for full treatment.

Continuous operation of lamp assembly at full power for an extended time can result in overheating of the lamp unless sufficient air cooling is provided, having an air pressure around magnetron 32 significantly greater than that within reflector 36 around bulb 34. Continued operation of blower 28 at a level providing such a high air pressure is uneconomical. It is common practice, therefore, to provide a lower level of power to lamp assembly 22 when sensor 40 senses the absence of articles at article treating location 12c and to slow the blower operation so as to decrease the air pressure proportionally. However, often that causes overcooling of the bulb, resulting in poor performance and damage to the bulb.

Figure 2:
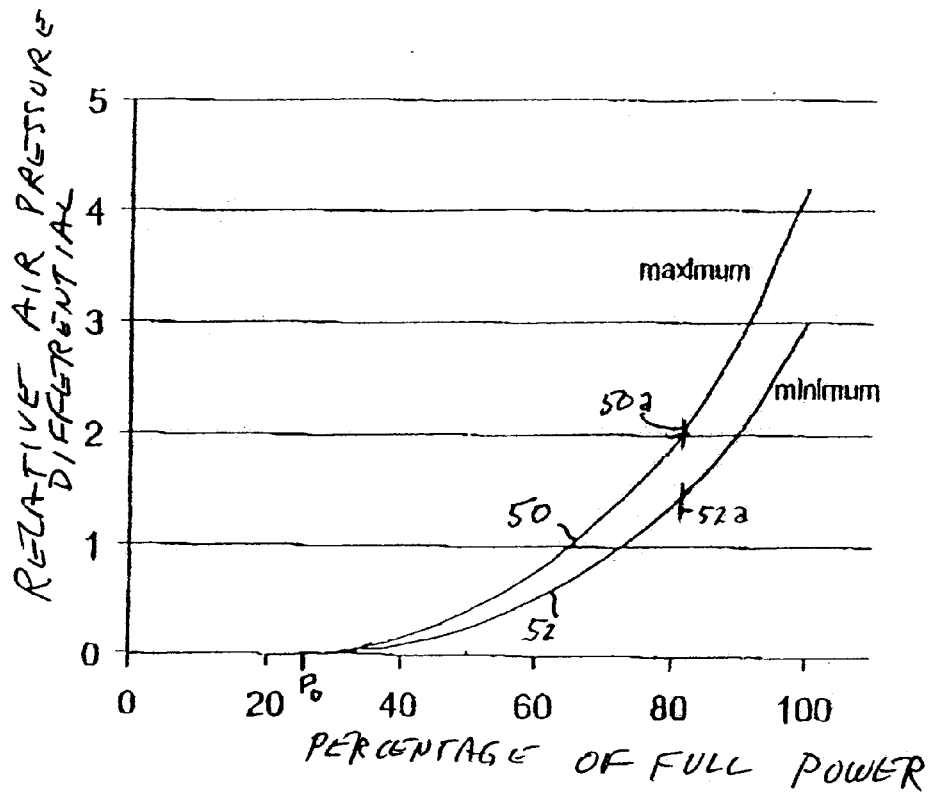
FIG. 2 is a graph illustrating the cooling air pressure requirement for a lamp system as a function of the power provided to the lamp, expressed as a percentage of the lamp's intended full-power level, in order to provide satisfactory lamp bulb cooling, in accordance with the present invention.

FIG. 2 is a graph illustrating the cooling air pressure differentials required for satisfactory operation of lamp assembly 22. The horizontal axis represents percentage of the lamp's intended full power, while the vertical axis represent the relative air pressure differential across reflector 36 for satisfactory operation of lamp assembly 22. Curve 50 presents the maximum air pressure differential for satisfactory operation, while curve 52 presents the minimum air pressure differential. For a lamp operating at any given percentage of full power, it is desired that the air pressure differential fall between the maximum and the minimum in order to maintain the temperature of lamp assembly 22 within the acceptable operating range. By way of illustration, if lamp assembly 22 is operating at 81% of full power, then the air pressure differential must fall between point 50a on curve 50 and point 52a on curve 52.

Curves 50 and 52 are approximately, but not exactly, general exponential curves, or curves approximately satisfying the relationship $A_p = (P-P_o)^2$, where $A_p$ is air pressure, P is the power level of the power being provided to the air-cooled lamp as a percentage of the lamp's intended full-power level, and $P_o$ is a power level, as a percentage of that full-power level, which when provided to the air-cooled lamp requires no air pressure differential for adequate cooling at the intended full power level of the lamp. FIG. 2 illustrates this as $P_0 = 25\%$. The reduced power level might be provided as continuous power at the reduced level, for example 80%. Alternatively, the power might be provided at the reduced level by cycling power supply 26 between a high power level and a low power level, the reduced provided power then being the average power provided over each cycle.

Figure 3:
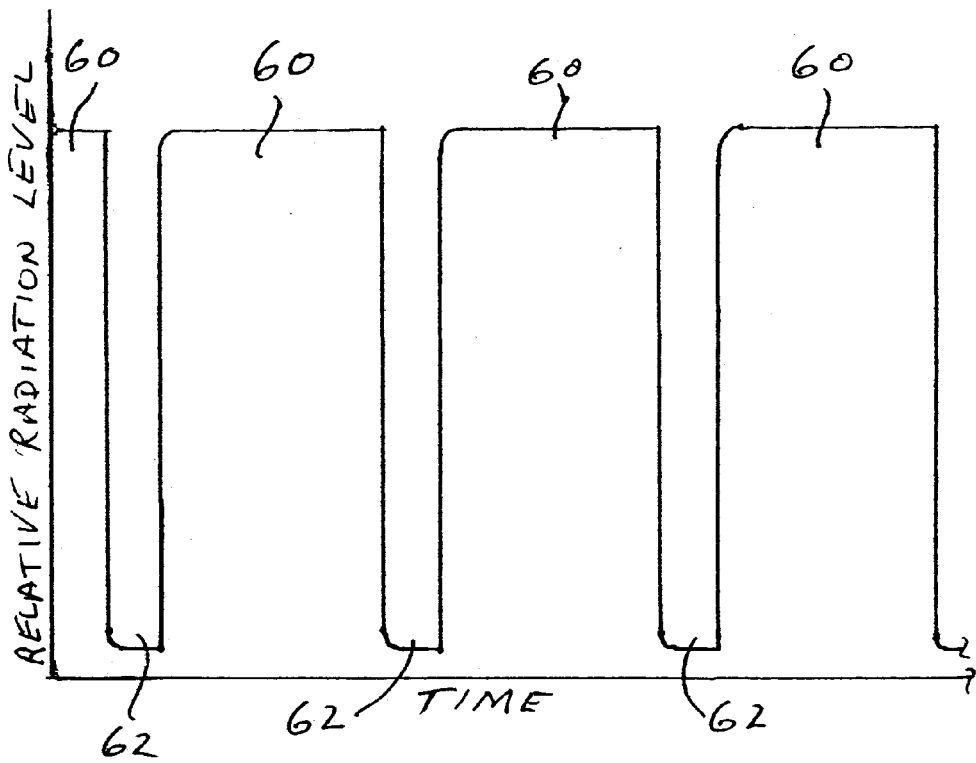
FIG. 3 is a graph illustrating an example of a duty cycle of a lamp.

FIG. 3 illustrates a cycle typical of those that might be provided to lamp assembly 22. In the illustrative example of FIG. 3, power is provided with a the duty cycle made up of alternating intervals 60 of high power and intervals 62 of low power. FIG. 3 illustrates the high power intervals 60 at 100% of intended full power with a duration in the order of four seconds and the low power intervals 62 at 5% of full power with a duration in the order of one second, thus providing an 81% time-weighted average power level. For relatively short cycle times, for example high power intervals 60 of not more than eight seconds with low power intervals 62 of not more than two seconds, blower 28 can provide air at a continuous pressure between points 50a and 52a in FIG. 2. For longer cycle times, blower 28 can provide air at a pressure in the range between the 100% points on curves 50 and 52 during high power intervals 60, while during the low power intervals 62 blower 28 can be stopped or slowed so that it results in an insignificant air pressure differential. In either case, lamp assembly 22 is maintained at at least a standby power level which is insufficient to cause lamp assembly 22 to project radiation at a level effective in treating an article 10, but sufficient to maintain ionization of the bulb plasma and also to allow the bulb fill to remain in a vaporized state longer.

During cyclical operation, the high power intervals 60 might provide power at a level substantially equal to the intended full-power level of lamp assembly 22, for example 2800 watts. Due to the advantageous effects of the cooling in accordance with the present invention, such a lamp assembly might instead be operated in a cycle having an ultra-high power level, in excess of the intended full-power level, for example a power level of 4200 watts. Nevertheless, the cyclical operation results in the average power level being lower, and with a cooling air pressure differential based on the average power level in accordance with the present invention, satisfactory cooling is obtained.

Figure 4:
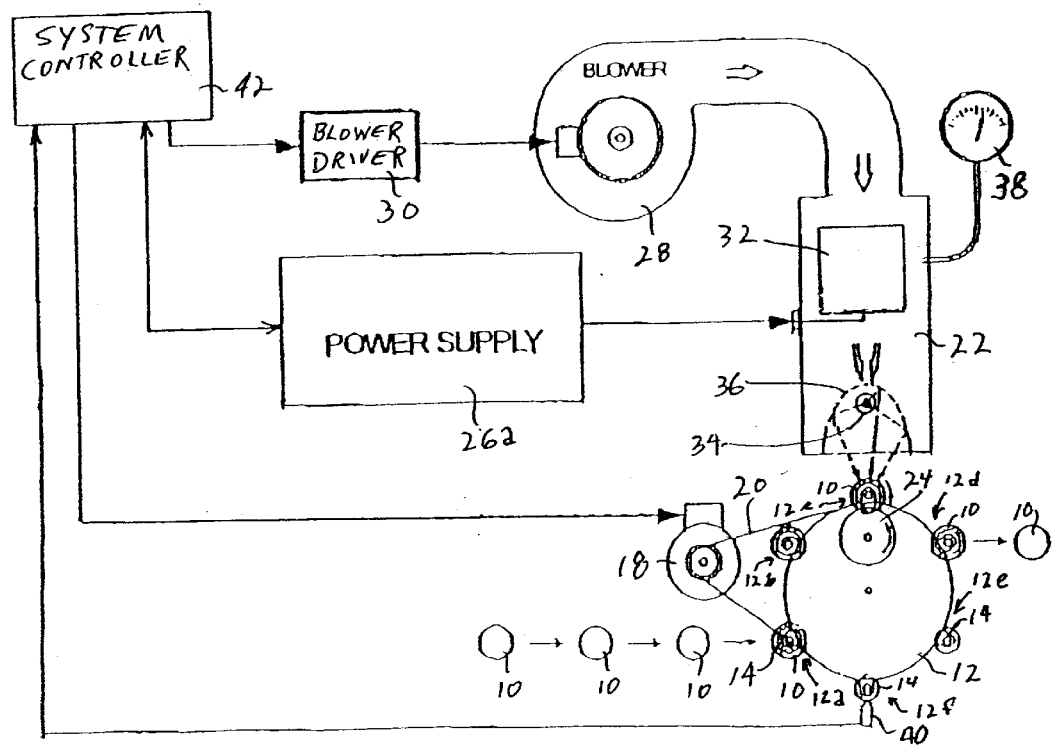
FIG. 4 is a block diagram of a second embodiment of an article treatment system in accordance with the present invention.

FIG. 4 is a block diagram of a second embodiment of an article treatment system in accordance with the present invention. The system of FIG. 4 differs from that of FIG. 1 by omitting machine controller 16 and by having a system controller 42. The output of sensor 40 is applied to system controller 42. System controller 42 provides start and stop signals to motor 18 and power supply 26a based on the signals from sensor 40 which indicate the presence or absence of an article at article treating location 12c. Power supply 26a provides power to lamp assembly 22 and provides system controller 42 with a signal indicating the level of that power. System controller 42 provides a signal to blower driver 30 which causes blower 28 to provide air with a pressure differential to result in proper cooling of lamp assembly 22, based on the power level signal applied to the system controller by power supply 26a.

Lamp assembly 22 is generally provided with power at a constant voltage of, for example, 4000 volts, with a current that varies from 0.05 amps at its lowest power level to one amp at full power. The power level signal applied by power supply 26 to blower driver 30 or applied by power supply 26a to system controller 42 can be, for example, an analog signal varying as the average power supplied to lamp assembly 22 varies from 5% of full power to 100% of full power. By way of example, the signal might be a voltage which varies, say, from 0.5 volts to 10 volts as the lamp power varies from 5% to 100% of full power. Alternatively, it might be a current which varies from, say, 1 ma to 20 ma as the lamp power varies from 5% to 100% of full power. The speed of blower 28 is generally directly proportional to the drive frequency from blower driver 30. The air pressure resulting from operation of blower 30 has a relationship to the blower speed that is approximately exponential or approximately given by $P=(S-S_0)^2$, where P is the pressure, S is the blower speed, and $S_0$ is the blower speed at which $P=P_0$.

Preferably, blower driver 30 is a programmable variable frequency driver, such as an Allen Bradley Series 160 driver, that is programmed with the necessary parameters for the characteristics of lamp assembly 22 and blower 28, enabling the blower driver to automatically and rapidly provide the necessary drive frequency to blower 28. Likewise, in the embodiment of FIG. 4, preferably system controller 42 is programmed to provide the necessary signals based on these same factors.

The present invention thus provides improved cooling of air-cooled lamps and improved treatment of articles. Although the invention has been described with reference to preferred embodiments, various substitutions, alterations, and rearrangements might be made, and still the result would be within the scope of the invention. By way of example, a lamp assembly with an electroded bulb might be used. Likewise, a blower that is responsive to applied voltage, rather than the applied frequency might be utilized, together with a variable voltage motor driver.

What is claimed is:

1. A lamp system, comprising:
    an air-cooled lamp responsive to application of electrical power thereto to emit radiation;
    a power supply for providing power to said air-cooled lamp;
    an air blower for blowing air onto said air-cooled lamp to cool said air-cooled lamp; and
    a blower driver responsive to the level of the power being provided to said air-cooled lamp by said power supply, to drive said air blower at a speed blowing air onto said air-cooled lamp with an air pressure having a predetermined non-linear relationship with the power level.

2. A lamp system as claimed in claim 1, wherein the non-linear relationship is substantially exponential.

3. A lamp system as claimed in claim 1, wherein the non-linear relationship is substantially defined by $A_p=(P-P_o)^2$, where $A_p$ is air pressure, P is the power level of the power being provided to said air-cooled lamp, and $P_o$ is the power level that when provided to said air-cooled lamp requires no air to be blown onto said air-cooled lamp by said air blower.

4. A lamp system as claimed in claim 1, wherein said air-cooled lamp comprises an ultraviolet lamp.

5. A lamp system as claimed in claim 4, wherein said ultraviolet lamp comprises an electrodeless lamp bulb.

6. A lamp system as claimed in claim 1, wherein said air-cooled lamp comprises an ultraviolet lamp bulb, and a magnetron for providing microwave energy to said ultraviolet lamp bulb.

7. A lamp system as claimed in claim 1, wherein said blower driver comprises a variable frequency motor driver.

8. A lamp system as claimed in claim 1, wherein said power supply provides said blower driver with a control signal proportional to the level of power provided by said power supply to said air-cooled lamp.

9. A lamp system as claimed in claim 8, wherein the control signal is a voltage signal.

10. A lamp system as claimed in claim 8, wherein the control signal is a current signal.

11. A lamp system as claimed in claim 8, wherein said power supply provides said lamp with a constant voltage, and wherein the control signal is proportional to the level of current provided by said power supply to said air-cooled lamp.

12. A lamp system as claimed in claim 1, wherein said lamp system further comprises a controller for controlling the level of the power supplied by said power supply.

13. A lamp system as claimed in claim 1, wherein said lamp system further comprises a controller for causing said power supply to operate with a duty cycle between a high power level and a low power level.

14. A lamp system as claimed in claim 13, wherein said blower driver drives said air blower at a speed blowing air onto said air-cooled lamp with an constant air pressure based on a time-weighted average of the power level.

15. A lamp system as claimed in claim 13, wherein said blower driver drives said blower with a duty cycle corresponding with the power supply duty cycle.

16. A lamp system as claimed in claim 13, wherein said air-cooled lamp has an intended full-power level, and wherein the high power level is in excess of the full-power level.

17. A lamp system as claimed in claim 13, wherein the non-linear relationship is substantially exponential.

18. A lamp system as claimed in claim 13, wherein said air-cooled lamp has an intended full-power level, and wherein the non-linear relationship is substantially defined by $A_p=(P-P_o)^2$, where $A_p$ is air pressure, P is the power level of the power being provided to said air-cooled lamp as a percentage of the full-power level, and $P_o$ is the power level that when provided to said air-cooled lamp requires no air to be blown onto said air-cooled lamp by said air blower as a percentage of the full-power level.

19. A lamp system as claimed in claim 13, wherein said air-cooled lamp comprises an ultraviolet lamp.

20. A lamp system as claimed in claim 19, wherein said ultraviolet lamp comprises an electrodeless lamp bulb.

21. A lamp system as claimed in claim 13, wherein said air-cooled lamp comprises an ultraviolet lamp bulb, and a magnetron for providing microwave energy to said ultraviolet lamp bulb.

22. A lamp system as claimed in claim 13, wherein said blower driver comprises a variable frequency motor driver.

23. A lamp system as claimed in claim 13, wherein said power supply provides said blower driver with a control signal proportional to the level of power provided by said power supply to said air-cooled lamp.

24. A lamp system as claimed in claim 23, wherein the control signal is a voltage signal.

25. A lamp system as claimed in claim 23, wherein the control signal is a current signal.

26. A lamp system as claimed in claim 23, wherein said power supply provides said lamp with a constant voltage, and wherein the control signal is proportional to the level of current provided by said power supply to said air-cooled lamp.

27. A lamp system as claimed in claim 13, wherein:
said controller causes said power supply to operate between the high power level and the low power level with a preset duty cycle having an average power level; and
said blower driver is responsive to the average power level of the power being provided to said air-cooled lamp to drive said air blower at a speed blowing air onto said air-cooled lamp with an air pressure having a non-linear relationship with the average power level.

28. An article treatment system, comprising:
an article conveyor for conveying a first article to an article treating location, maintaining the first article at the article treating location for a preset time, conveying the first article from the article treating location, and conveying a second article to the article treating location;
a sensor for sensing the presence or absence of an article at the article treating location;
an air-cooled lamp responsive to application of electrical power thereto to emit radiation;
a power supply responsive to said sensor sensing the presence of an article at the article treating location for providing power to said air-cooled lamp at a high power level, causing said air-cooled lamp to project radiation onto the article at the article treating location at a radiation level sufficient to effectively treat the article;
an air blower for blowing air onto said air-cooled lamp to cool said air-cooled lamp; and
a blower driver responsive to the level of the power being provided to said air-cooled lamp by said power supply, to drive said air blower at a speed blowing air onto said air-cooled lamp with an air pressure having a predetermined non-linear relationship with the power level.

29. An article treatment system as claimed in claim 28, wherein said power supply is further responsive to said sensor sensing absence of an article at the article treating location for providing power to said air-cooled lamp at a low power level, insufficient to cause said air-cooled lamp to project radiation at a radiation level effective in treating the article.

30. An article treatment system as claimed in claim 29, wherein said blower driver drives said air blower at a speed blowing air onto said air-cooled lamp with an constant air pressure based on a time-weighted average of the power level.

31. An article treatment system as claimed in claim 29, wherein said blower driver drives said blower at a speed blowing air onto said air-cooled lamp with a high pressure when the power supply is providing the high power level and with a low pressure when the power supply is providing the low power level.

32. An article treatment system as claimed in claim 28, wherein the non-linear relationship is substantially exponential.

33. An article treatment system as claimed in claim 28, wherein the non-linear relationship is substantially defined by $A_p=(P-P_o)^2$, where $A_p$ is air pressure, P is the power level of the power being provided to said air-cooled lamp, and $P_o$ is the power level that when provided to said air-cooled lamp requires no air to be blown onto said air-cooled lamp by said air blower.

34. An article treatment system as claimed in claim 28, wherein said air-cooled lamp comprises an ultraviolet lamp.

35. An article treatment system as claimed in claim 34, wherein said ultraviolet lamp comprises an electrodeless lamp bulb.

36. An article treatment system as claimed in claim 28, wherein said air-cooled lamp comprises an ultraviolet lamp bulb, and a magnetron for providing microwave energy to said ultraviolet lamp bulb.

37. An article treatment system as claimed in claim 28, wherein said blower driver comprises a variable frequency motor driver.

38. An article treatment system as claimed in claim 28, wherein said power supply provides said blower driver with a control signal proportional to the level of power provided by said power supply to said air-cooled lamp.

39. An article treatment system as claimed in claim 38, wherein the control signal is a voltage signal.

40. An article treatment system as claimed in claim 38, wherein the control signal is a current signal.

41. An article treatment system as claimed in claim 38, wherein said power supply provides said lamp with a constant voltage, and wherein the control signal is proportional to the level of current provided by said power supply to said air-cooled lamp.

42. An article treatment system, comprising:
an article conveyor for conveying an article to an article treating location and from the article treating location;
a sensor for sensing the presence or absence of the article at the article treating location;
an air-cooled lamp responsive to application of electrical power thereto to emit radiation, said air-cooled lamp having an intended full-power level;
a power supply for providing power to said air-cooled lamp, causing said air-cooled lamp to project radiation onto the article treating location;
an air blower;
a blower driver for driving said air blower to blow air onto said air-cooled lamp to cool said air-cooled lamp; and
a controller responsive to said sensor sensing the presence of the article at the article treating location to actuate said power supply to provide power to said air-cooled lamp at a high power level, causing said air-cooled lamp to project radiation onto the article at the article treating location at a radiation level sufficient to effectively treat the article, said controller further responsive to said sensor sensing absence of articles at the article treating location to actuate said power supply to provide power to said air-cooled lamp at a low power level, insufficient to cause said air-cooled lamp to project radiation at a radiation level effective in treating the article but sufficient to maintain ionization of any bulb plasma within said air-cooled lamp and to allow any bulb fill within said air-cooled lamp to remain in a vaporization state, said controller additionally responsive to said sensor sensing the presence of the article at the article treating location to allow a preset time to elapse and then to actuate said article conveyor to convey the article from the article treating location, said controller further responsive to the power level of the power being provided to said air-cooled lamp by said power supply to drive said air blower at a speed blowing air onto said air-cooled lamp with an air pressure having a pre-determined non-linear relationship with the power level.

43. An article treatment system as claimed in claim 42, wherein said controller drives said air blower at a speed blowing air onto said air-cooled lamp with an constant air pressure based on a time-weighted average of the power level.

44. An article treatment system as claimed in claim 42, wherein said controller drives said blower at a speed blowing air onto said air-cooled lamp with a high pressure when the power supply is providing the high power level and with a low pressure when the power supply is providing the low power level.

45. An article treatment system as claimed in claim 42, wherein the non-linear relationship is substantially exponential.

46. An article treatment system as claimed in claim 42, wherein the non-linear relationship is substantially defined by $A_p=(P-P_o)^2$, where $A_p$ is air pressure, P is the power level of the power being provided to said air-cooled lamp as a percentage of the intended full-power level, and $P_o$ is the power level that when provided to said air-cooled lamp requires no air to be blown onto said air-cooled lamp by said air blower as a percentage of the intended full-power level.

47. An article treatment system as claimed in claim 42, wherein said air-cooled lamp comprises an ultraviolet lamp.

48. An article treatment system as claimed in claim 47, wherein said ultraviolet lamp comprises an electrodeless lamp bulb.

49. An article treatment system as claimed in claim 42, wherein said air-cooled lamp comprises an ultraviolet lamp bulb, and a magnetron for providing microwave energy to said ultraviolet lamp bulb.

50. An article treatment system as claimed in claim 42, wherein said blower driver comprises a variable frequency motor driver.

51. An article treatment system as claimed in claim 42, wherein said power supply provides said blower driver with a control signal proportional to the level of power provided by said power supply to said air-cooled lamp.

52. An article treatment system as claimed in claim 51, wherein the control signal is a voltage signal.

53. An article treatment system as claimed in claim 51, wherein the control signal is a current signal.

54. An article treatment system as claimed in claim 51, wherein said power supply provides said lamp with a constant voltage, and wherein the control signal is proportional to the level of current provided by said power supply to said air-cooled lamp.

55. A method of cooling an air-cooled lamp, comprising:
sensing the power level of power being provided to the air-cooled lamp; and
blowing air onto the air-cooled lamp with an air pressure having a pre-determined non-linear relationship with the sensed power level.

56. A method as claimed in claim 55, wherein the non-linear relationship is substantially exponential.

57. A method as claimed in claim 55, wherein the non-linear relationship is substantially defined by $A_p=(P-P_o)^2$, where $A_p$ is air pressure, P is the power level of the power being provided to said air-cooled lamp, and $P_o$ is the power level that when provided to said air-cooled lamp requires no air to be blown onto said air-cooled lamp by said air blower.

58. A method of treating an article, comprising:
sensing the presence or absence of the article at an article treating location;
in response to the sensing of the presence of the article at the article treating location, providing power to an air-cooled lamp at a high power level, causing the air-cooled lamp to project radiation onto the article at the article treating location at a radiation level sufficient to effectively treat the article;
in response to sensing of the absence of the article at the article treating location, providing power to the air-cooled lamp at a low power level insufficient to cause the air-cooled lamp to project radiation at a radiation level effective in treating the article but sufficient to maintain ionization of any bulb plasma within said air-cooled lamp and to allow any bulb fill within said air-cooled lamp to remain in a vaporization state; and
blowing air onto the air-cooled lamp with an air pressure having a pre-determined non-linear relationship with the power level.

59. A method as claimed in claim 58, wherein the air is blown onto the air-cooled lamp with a constant air pressure based on a time-weighted average of the power level.

60. A method as claimed in claim 58, wherein the air is blown onto the air-cooled lamp with a high air pressure when the power supply is providing the high power level and with a low air pressure when the power supply is providing the low power level.

61. A method as claimed in claim 58, wherein the non-linear relationship is substantially exponential.

62. A method as claimed in claim 58, wherein the non-linear relationship is substantially defined by $A_p=(P-P_o)^2$, where $A_p$ is air pressure, P is the power level of the power being provided to said air-cooled lamp, and $P_o$ is the power level that when provided to said air-cooled lamp requires no air to be blown onto said air-cooled lamp by said air blower.

63. A machine-readable medium having stored thereon at least one sequence of instructions that, when executed, causes a machine to cool an air-cooled lamp by sensing the power level of power being provided to the air-cooled lamp, and activating an air blower to blow air onto the air-cooled lamp with an air pressure having a pre-determined non-linear relationship with the sensed power level.

64. A machine-readable medium as claimed in claim 63, wherein the non-linear relationship is substantially exponential.

65. A machine-readable medium as claimed in claim 63, wherein the non-linear relationship is substantially defined by $A_p=(P-P_o)^2$, where $A_p$ is air pressure, P is the power level of the power being provided to the air-cooled lamp, and $P_o$ is the power level that when provided to the air-cooled lamp requires no air to be blown onto the air-cooled lamp by the air blower.

66. A machine-readable medium having stored thereon at least one sequence of instructions that, when executed, causes a machine to cool an air-cooled lamp by sensing the presence or absence of the article at an article treating location; in response to the sensing of the presence of the article at the article treating location, activating a power supply to provide power to the air-cooled lamp at a high power level, causing the air-cooled lamp to project radiation onto the article at the article treating location at a radiation level sufficient to effectively treat the article; in response to sensing of the absence of the article at the article treating location, activating the power supply to provide power to the air-cooled lamp at a low power level insufficient to cause the air-cooled lamp to project radiation at a radiation level effective in treating the article but sufficient to maintain ionization of any bulb plasma within said air-cooled lamp and to allow any bulb fill within said air-cooled lamp to remain in a vaporization state, and activating an air blower to blow air onto the air-cooled lamp with an air pressure having a pre-determined non-linear relationship with the power level.

67. A machine-readable medium as claimed in claim 66, wherein the air blower is activated to blow air onto the air-cooled lamp with a constant air pressure based on a time-weighted average of the power level.

68. A machine-readable medium as claimed in claim 66, wherein the air blower is activated to blow air onto the air-cooled lamp with a high air pressure when the power supply is supplying the high power level and with a low air pressure when the power supply is supplying the low power level.

69. A machine-readable medium as claimed in claim 66, wherein the non-linear relationship is substantially exponential.

70. A machine-readable medium as claimed in claim 66, wherein the non-linear relationship is substantially defined by $A_p=(P-P_o)^2$, where $A_p$ is air pressure, P is the power level of the power being provided to the air-cooled lamp, and $P_o$ is the power level that when provided to the air-cooled lamp requires no air to be blown onto the air-cooled lamp by the air blower.

\* \* \* \* \*